US012794303B2

(12) United States Patent
Ghanimi et al.

(10) Patent No.: US 12,794,303 B2
(45) Date of Patent: Nov. 10, 2026

(54) METHOD FOR PRODUCING AN ANNULAR WINDING HEAD SUPPORT, AND WINDING HEAD SUPPORT

(71) Applicant: ANDRITZ HYDRO GmbH, Vienna (AT)

(72) Inventors: Yassar Ghanimi, Graz (AT); Alexander John, Graz (AT); Oliver Jantschner, Stattegg (AT)

(73) Assignee: ANDRITZ HYDRO GmbH, Vienna (AT)

( * ) Notice: Subject to any disclaimer, the term of this patent is extended or adjusted under 35 U.S.C. 154(b) by 195 days.

(21) Appl. No.: 18/834,833

(22) PCT Filed: Nov. 24, 2022

(86) PCT No.: PCT/AT2022/060415
§ 371 (c)(1),
(2) Date: Jul. 31, 2024

(87) PCT Pub. No.: WO2023/150809
PCT Pub. Date: Aug. 17, 2023

(65) Prior Publication Data

US 2025/0125678 A1 Apr. 17, 2025

(30) Foreign Application Priority Data

Feb. 9, 2022 (AT) .............................. A 50080/2022

(51) Int. Cl.
*H02K 3/51* (2006.01)

(52) U.S. Cl.
CPC ........... *H02K 3/51* (2013.01); *H02K 2213/12* (2013.01)

(58) Field of Classification Search
CPC ............................. H02K 3/51; H02K 2213/12
USPC ........................................................ 310/40 R
See application file for complete search history.

(56) References Cited

U.S. PATENT DOCUMENTS 6,366,001 B1 * 4/2002 Gunnarsson ............. H02K 7/04 310/194

FOREIGN PATENT DOCUMENTS

| | | | | |
|---|---|---|---|---|
| AT | 508 622 | | 5/2012 | |
| CN | 105397250 A | * | 3/2016 | ........... B23K 35/383 |
| DE | 100 05 006 | | 8/2000 | |
| GB | 970228 | | 9/1964 | |

(Continued)

OTHER PUBLICATIONS

Int'l Search Report (SR) (Form PCT/ISA/210) conducted in Int'l Appln. No. PCT/AT2022/060415 (Feb. 24, 2023).

(Continued)

*Primary Examiner* — Jose A Gonzalez Quinones
(74) *Attorney, Agent, or Firm* — GREENBLUM & BERNSTEIN, P.L.C.

(57) ABSTRACT

A method for producing an annular winding head support for a rotor of a rotating electric machine. In order to be able to produce a winding head support for particularly large machines in a simple manner, ring segments are created, after which the ring segments are connected to create a ring that constitutes the winding head support. In addition, the electric machine has a stator and a rotor, with the rotor including at least one winding head at an end side. A winding head support is provided in order to accommodate centrifugal forces occurring during operation.

19 Claims, 3 Drawing Sheets

(56) References Cited

FOREIGN PATENT DOCUMENTS

| | | | | | |
|---|---|---|---|---|---|
| JP | S62144543 | A | * | 6/1987 | |
| WO | WO-2021261565 | A1 | * | 12/2021 | ......... H01R 43/0221 |

OTHER PUBLICATIONS

Int'l Prelim. Exam. Report (IPER) (Form PCT/IPEA/409) conducted in Int'l Appln. No. PCT/AT2022/060415 (May 22, 2024).
Int'l Written Opinion (WO) (Form PCT/ISA/237) conducted in Int'l Appln. No. PCT/AT2022/060415 (Feb. 24, 2023).

* cited by examiner

METHOD FOR PRODUCING AN ANNULAR WINDING HEAD SUPPORT, AND WINDING HEAD SUPPORT

The invention relates to a method for producing an annular winding head support for a rotor of a rotating electric machine.

The invention furthermore relates to a winding head support for a rotor of an electric machine, comprising at least one ring.

Winding head supports for rotors of electric machines and methods for producing the same are known from the prior art. Winding head supports of this type are used in order to accommodate centrifugal forces acting on a winding head of the rotor due to a rotation, so that impermissible deformations of the winding head are prevented. Winding head supports from the prior art are normally created using a high-strength material, typically by a high-strength, non-magnetizable steel, and often comprise, as described in the document AT 508 622 A1 for example, one or more rings, wherein corresponding rings are typically created by forging and rolling and, if necessary, additional methods for obtaining a particularly high strength.

However, winding head supports of this type can only be created up to a predetermined maximum size by a given rolling apparatus. Furthermore, a maximum size of winding head supports of this type is also limited by a transport route from a fabrication facility to a location at which the electric machine is to be operated, typically a power plant. Thus, up to now, it has only been possible to produce winding head supports up to a maximum inner diameter of up to approximately 6 m, whereby said winding head supports can also become a limiting factor in a machine design.

This is addressed by the invention. The object of the invention is to specify a method of the type named at the outset with which a winding head support can be produced independently of a limitation predetermined by forging or rolling equipment.

Furthermore, a winding head support of this type is to be specified.

According to the invention, the first object is attained by a method of the type named at the outset in which ring segments are created, after which the ring segments are connected to create a ring that constitutes the winding head support.

In the course of the invention, it was found that, through the production of corresponding ring segments, forging or rolling equipment that is suitable for producing complete rings having a corresponding diameter is no longer necessary; rather, it is then sufficient to provide equipment with which only the ring segments can be created. The ring segments can, in principle, be produced in any desired manner known from the prior art, for example by machining or forming. Likewise, it is in principle possible to connect the individual ring segments in any desired manner known from the prior art, in particular in a form-fitting, force-fitting, or materially bonded manner.

The individual ring segments thus no longer extend about an entire circumference of the ring, but rather each constitute only a portion of the ring circumference, for which reason they can be very easily produced. Typically, the ring is divided into ring segments along planes, which planes contain an axis of rotation of the ring.

In order to achieve a particularly high efficiency, and to already be able to ensure the producibility of a corresponding winding head support at low costs, it is preferably provided that roughly identical ring segments are used. In this manner, a high degree of identical parts in a fabrication can be achieved, so that a particularly simple production is possible. Typically, one of the ring segments extends over a range of 20 degrees to 180 degrees of an entire ring, so that the ring can be created, for example, from two to 18 ring segments that essentially have identical dimensions.

Particularly preferably, it is provided that two to ten, in particular three or four, ring segments are created which each extend over equal portions of a circumference of the ring. It shall be understood that a circumferential region that is then covered by a ring segment corresponds to an entire circumference of the ring divided by the number of ring segments, in the case of three segments therefore 120 degrees per ring segment, for example.

It is beneficial if the ring segments are created from plate-shaped elements by forming, in particular by cold forming, preferably by bending. A production can then take place, for example, in that metal sheets having corresponding outer dimensions are first cut from a plate-shaped material, such as a metal sheet of a corresponding thickness and of a corresponding material, after which the metal sheets are formed, typically using cold forming or by bending, in order to transform the initially roughly flat metal sheets into corresponding circular segments having a radius corresponding to the winding head support that is to be created. With the forming, an additional strengthening, in particular a strain hardening, can occur.

In principle, the ring segments can be created from any desired material that is suitable for accommodating the mechanical and thermal loads occurring in a winding head support, such as a metal, a composite material, or a fiber-reinforced composite material, for example. It is particularly preferably provided that the ring segments comprise a steel, in particular an austenitic steel, or are composed of a steel of this type. Typically, a non-magnetizable steel is used in order to prevent electrical losses in the winding head to the greatest possible extent.

As stated, the ring segments can, in principle, be connected in the most diverse manners to create the ring. Particularly if the ring segments are created using a steel such as an austenitic steel, for example, it is preferably provided that the ring segments are connected by welding. A connection both by fusion welding and by pressure welding, such as friction stir welding for example, is thereby possible.

In order to obtain a particularly high strength of the winding head support, it can be provided that a heat treatment is carried out after a connection of the ring segments. In the heat treatment, stresses introduced by the preceding method steps can also be reduced, for example by stress-relief annealing.

Particularly for the reduction of a residual imbalance, or to achieve a maximally tolerable imbalance, it is beneficial if, after a connection of the ring segments, in particular after a heat treatment, the ring is mechanically processed, in particular using a machining method, in order to obtain defined dimensions. The ring created by the connected ring segments, or the winding head support, can for this purpose by processed by lathing and/or milling, for example.

A winding head support according to the invention can, in principle, be used for electric rotating machines of the most different sizes. It is particularly beneficial if a corresponding winding head support is used in particularly large machines, especially since problems in the area of fabrication and transport that can otherwise be expected with one-piece rings of a corresponding size can thereby be easily avoided. It is therefore preferably provided that the ring segments and the ring have an inner radius of more than 0.5 m, preferably more than 2 m, in particular more than 3 m. As a result, rings having an inner diameter of, for example, 6 m or more can easily be created. Depending on a transport route to a facility in which the corresponding electric machine is to be used, it can also thereby be provided that the individual ring segments are first assembled into a ring or into a winding head support on-site, so that said ring segments can be transported individually, and therefore in a space-saving manner, to the facility.

The other object is attained according to the invention by a winding head support of the type named at the outset in which the ring is created by connected ring segments. Particularly preferably, it is provided that the winding head support is produced in a method according to the invention.

A winding head support of this type is, compared to winding head supports from the prior art, especially easy to produce and, in particular, requires no forging and rolling equipment that is designed to produce one-piece rings having a corresponding diameter.

It is preferably provided that the ring segments are connected by welding.

It is beneficial if the winding head support comprises at least one ring with an inner diameter of more than 1 m, in particular more than 4 m, preferably more than 6 m.

In an electric machine with a stator and a rotor, with the rotor comprising a winding head at one end, wherein a winding head support is provided in order to accommodate centrifugal forces occurring during operation, it is preferably provided that the winding head support is embodied according to the invention. It is particularly preferred that all annular winding head supports of the machine are embodied according to the invention.

It shall be understood that the winding head support or the ring is arranged on the rotor such that an axis of rotation of the ring essentially coincides with a rotor axis.

Additional features, advantages, and effects of the invention follow from the exemplary embodiments described below. In the drawings which are thereby referenced:

Figure 1:
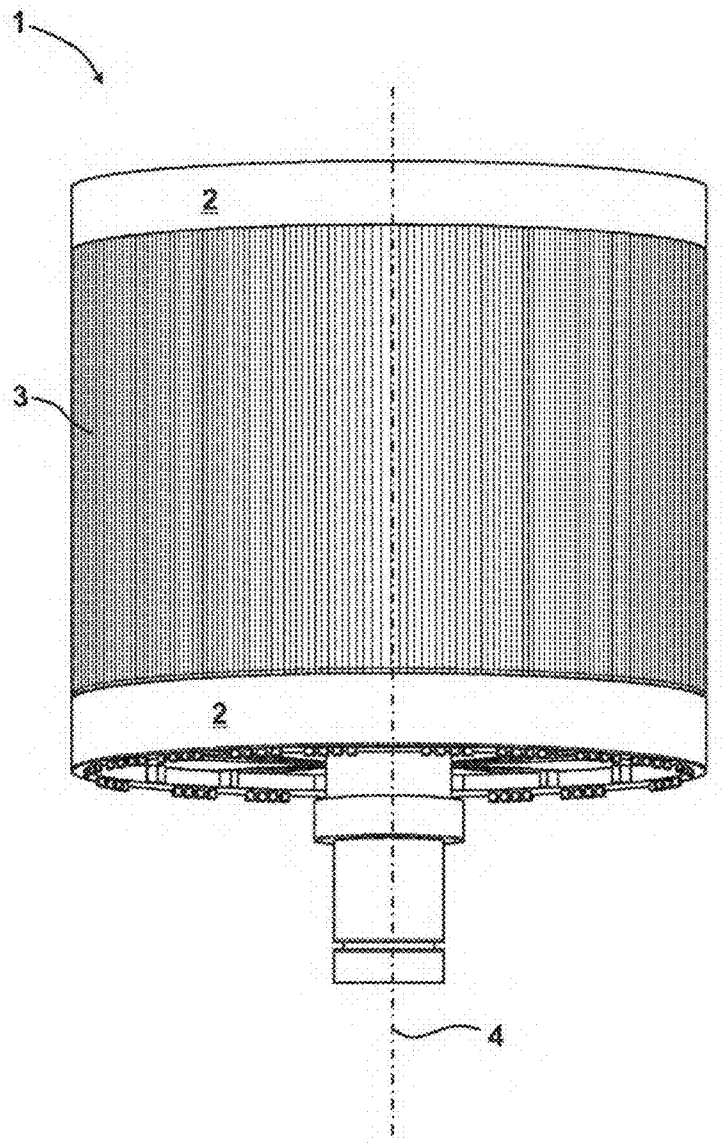
FIG. 1 shows an electric machine embodied as an asynchronous machine.

FIG. 1 shows a rotor 1 of an electric machine, in this case embodied as an asynchronous machine, which can, for example, be used as a motor or generator in a hydroelectric power plant. The rotor 1 comprises a rotor shaft and a laminated rotor core 3 in which a rotor winding is arranged. The rotor winding protrudes past the laminated rotor core 3 at an end side, whereby winding heads are created. In order to support the winding heads against centrifugal forces occurring due to a rotation of the rotor 1 about a rotor axis 4 during operation, annularly embodied winding head supports are provided. The winding head supports can comprise an outer ring and an inner ring, wherein in FIG. 1 only the rings 2 of the winding head support that are embodied as outer rings are visible. A basic construction of a winding head support with an outer ring and an inner ring is known from the document AT 508 622 A1, for example.

Figure 2:
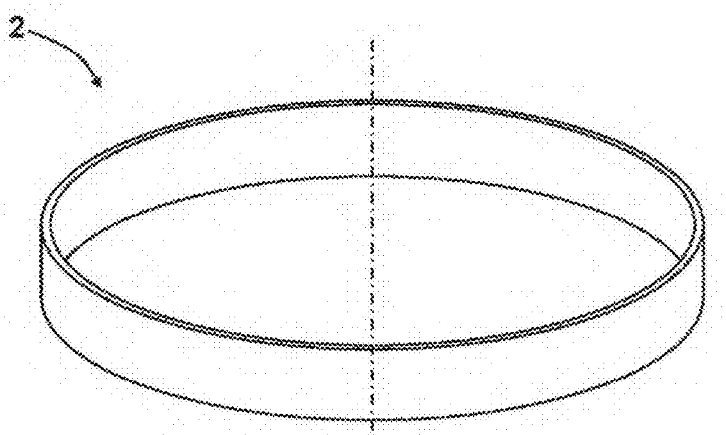
FIG. 2 shows a winding head support from the prior art.

FIG. 2 shows in detail a ring 2, embodied to be roughly hollow-cylindrical, of a winding head support from the prior art, which ring 2 could be used, for example, as an outer ring in the rotor 1 illustrated in FIG. 1. As can be seen, this winding head support is embodied in one piece. The production of such rings 2, in particular for rotors 1 having large diameters, is associated with considerable expenditure and normally requires correspondingly sized rolling and forging equipment. A transport of such rings 2 is likewise possible only with great expenditure.

Figure 3:
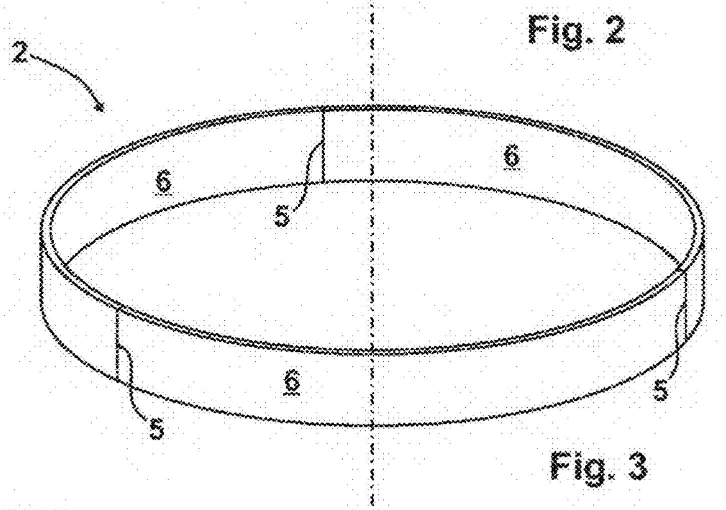
FIGS. 3 and 4 show winding head supports according to the invention.
Figure 4:
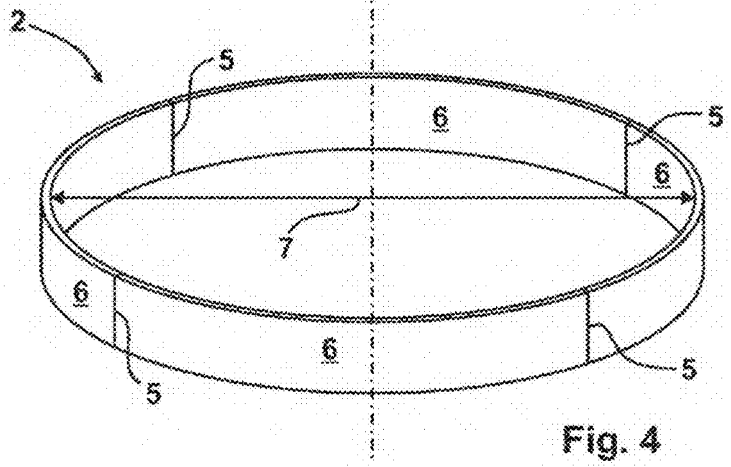

FIGS. 3 and 4 show winding head supports according to the invention, wherein the winding head support illustrated in FIG. 3 is embodied in three pieces and the winding head support illustrated in FIG. 4 is embodied in four pieces. As can be seen, the winding head support, once again roughly hollow-cylindrical or annular, is in this case respectively composed of multiple ring segments 6 of an equal size that are connected to create a ring 2. The individual ring segments 6 thereby each extend about a portion of a circumference of the ring 2, which portion corresponds to a total circumference divided by the number of the ring segments 6. Accordingly, the ring segments 6 illustrated in FIG. 3 each extend over approximately 120 degrees, and the ring segments 6 illustrated in FIG. 4 each extend over approximately 90 degrees. As a result, these ring segments 6 are easier to produce and are able to be transported in a smaller space than the finished ring 2.

Typically, the individual ring segments 6 can be created by cold forming from austenitic, high-strength, and non-magnetic metal sheets, so that said metal sheets have a corresponding radius that can be 3 m or more in the winding head supports illustrated in FIGS. 3 and 4, for example, in order to create a ring 2 with an inner diameter 7 of 6 m, for example.

The individual ring segments 6 are then connected, typically by welding, after which a heat treatment and a final mechanical processing can be carried out. Accordingly, in FIGS. 3 and 4, welds 5 are visible on the contact surfaces between the ring segments 6, which welds 5 run roughly parallel to the rotor axis 4, which corresponds to an axis of the ring.

Figure 5:
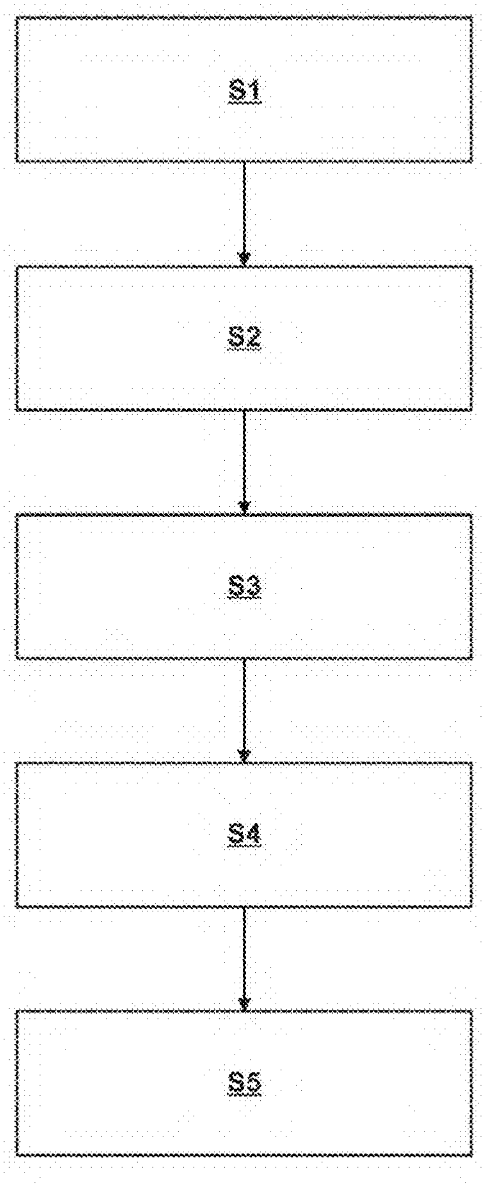
FIG. 5 shows a flow chart of a method according to the invention.

FIG. 5 shows a flow chart of a method according to the invention for producing a winding head support such as that which is illustrated in FIGS. 3 and 4. In a first method step S1, flat, plate-shaped elements or metal sheets are thereby cut out from an austenitic, non-magnetic, and high-strength steel, for example by laser cutting, after which in a second method step S2 the cut-out metal sheets are formed by rolling, bending, and/or cold forming until said metal sheets have a desired radius of, for example, 3 m for a ring 2 with an inner diameter 7 of 6 m. A further strengthening of the material can also occur, as part of the forming.

In a next, third method step S3, the individual ring segments 6 are connected by welding in order to create the ring 2. Dividing planes, which divide the ring 2 into the individual ring segments 6, typically contain the rotor axis 4, for which reason the welds 5 typically ran parallel to the rotor axis 4. In principle, however, other dividing planes, for example oblique dividing planes, are of course also possible.

In a further, fourth method step S4, a heat treatment of the ring 2 takes place, which heat treatment depends on the material used, typically an austenitic, non-magnetic, high-strength steel.

In a further, fifth method step S5, a final mechanical processing takes place in order to obtain exact dimensions of the winding head support and, in particular, to reduce an imbalance.

It shall be understood that the individual method steps can be implemented both in a production plant and on-site at a construction site at which a power plant having an electric machine in which the rings 2 are to be used as a winding head support is being built. Of course, it is also possible to perform only some of the method steps at a fabrication facility and, for example, to carry out a connection of the individual ring segments 6 and the subsequent method steps at an operating location, in order to reduce dimensions of objects that are to be transported.

With a winding head support produced according to the invention, it is in particular possible to create particularly large rotors 1 for electric machines, such as asynchronous machines for example, especially since in this case, in contrast to one-piece winding head supports, no equipment is required that enables the production of components which have a size corresponding to a diameter of the rotor 1.

In particular, it is therefore possible to produce winding head supports with a diameter of 6 m or more in a particularly simple manner. Furthermore, winding head supports produced according to the invention can also first be created on-site at a construction site, so that even a transport through difficult terrain is easily possible, especially since only the individual ring segments 6, but not the entire winding head support with a correspondingly large diameter, need to be transported.

The invention claimed is:

1. A method for producing an annular winding head support for a rotor of a rotating electric machine, which winding head support is suitable for accommodating centrifugal forces acting on a winding head of the rotor due to a rotation, in order to prevent impermissible deformations of the winding head, comprising:

creating ring segments;

then connecting the ring segments to create a ring that constitutes the winding head support, wherein the ring segments are created from plate-shaped elements by cold forming, and wherein the ring segments and the ring have an inner radius of more than 0.5 m.

2. The method according to claim 1, wherein roughly identical ring segments are used.

3. The method according to claim 1, wherein two to ten ring segments are created which each extend over equal portions of a circumference of the ring.

4. The method according to claim 1, wherein the ring segments are created by bending.

5. The method according to claim 1, wherein the ring segments comprise a steel or are composed of a steel of this type.

6. The method according to claim 1, wherein the ring segments are connected by welding.

7. The method according to claim 1, wherein a heat treatment is carried out after a connection of the ring segments.

8. The method according to claim 1, wherein after a connection of the ring segments the ring is mechanically processed in order to obtain defined dimensions.

9. The method according to claim 1, wherein the inner radius of the ring segments and the ring more than 2 m.

10. A winding head support for a rotor of an electric machine, which winding head support is suitable for accommodating centrifugal forces acting on a winding head of the rotor, in order to prevent impermissible deformations of the winding head, comprising:

at least one ring, wherein the ring is created from connected ring segments, which ring segments are created from plate-shaped elements by cold forming using the method according to claim 1, and wherein the winding head support comprises at least one ring with an inner diameter of more than 1 m.

11. The winding head support according to claim 10, wherein the ring segments are connected by welding.

12. The winding head support according to claim 10, wherein the inner diameter of the at least one ring is more than 4 m.

13. An electric machine having a stator and a rotor, with the rotor comprising at least one winding head at an end side, wherein a winding head support is provided in order to accommodate centrifugal forces occurring during operation, wherein the winding head support is embodied according to claim 10.

14. The method according to claim 3, wherein only three or four ring segments are created and extend over equal portions of the circumference of the ring.

15. The method according to claim 5, wherein the steel comprises an austenitic steel.

16. The method according to claim 8, wherein after a heat treatment the ring is mechanically processed using a machining method in order to obtain defined dimensions.

17. The method according to claim 9, wherein the inner radius of the ring segments and the ring are more than 3 m.

18. The method according to claim 10, wherein the ring segments are created from plate-shaped elements by cold forming according to the method of claim 1.

19. The winding head support according to claim 12, wherein the inner diameter of the at least one ring is more than 6 m.

* * * * *